United States Patent
Watson, III et al.

(10) Patent No.: US 9,965,759 B2
(45) Date of Patent: *May 8, 2018

(54) OBFUSCATING PRIVATE INFORMATION USING A TRANSACTION IDENTIFIER

(71) Applicant: Bank of America Corporation, Charlotte, NC (US)

(72) Inventors: Verlon S. Watson, III, Charlotte, NC (US); Piotr Zupinski, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 219 days.

This patent is subject to a terminal disclaimer.

(21) Appl. No.: 15/049,442

(22) Filed: Feb. 22, 2016

(65) Prior Publication Data

US 2016/0253637 A1 Sep. 1, 2016

Related U.S. Application Data

(63) Continuation of application No. 14/632,561, filed on Feb. 26, 2015, now Pat. No. 9,305,181.

(51) Int. Cl.
| | |
|---|---|
| *G06K 5/00* | (2006.01) |
| *G06Q 20/38* | (2012.01) |
| *G06F 21/62* | (2013.01) |
| *G07G 5/00* | (2006.01) |
| *H04L 29/06* | (2006.01) |
| *G06K 19/06* | (2006.01) |
| *G06Q 20/40* | (2012.01) |
| *G06Q 20/04* | (2012.01) |

(52) U.S. Cl.
CPC ....... *G06Q 20/383* (2013.01); *G06F 21/6254* (2013.01); *G06K 19/06037* (2013.01); *G06Q 20/045* (2013.01); *G06Q 20/382* (2013.01); *G06Q 20/405* (2013.01); *G07G 5/00* (2013.01); *H04L 63/04* (2013.01); *G06F 2221/2107* (2013.01); *G06F 2221/2117* (2013.01); *G06F 2221/2151* (2013.01); *H04L 2463/102* (2013.01)

(58) Field of Classification Search
CPC ...... G06Q 20/202; G06Q 20/20; G06Q 20/24; G06Q 20/3278; G06Q 20/40; G06Q 50/01; G06F 21/10; G07F 7/0886; G07G 1/14
USPC ......................................... 235/380
See application file for complete search history.

(56) References Cited

U.S. PATENT DOCUMENTS

| | | | |
|---|---|---|---|
| 9,305,181 B1* | 4/2016 | Watson, III | G06F 21/6254 |
| 2012/0206128 A1* | 8/2012 | Marshall | G01N 17/04 |
| | | | 324/149 |
| 2012/0290420 A1* | 11/2012 | Close | G06Q 20/20 |
| | | | 705/17 |
| 2013/0326078 A1 | 12/2013 | Pilkington | |

(Continued)

*Primary Examiner* — Thien M Le
(74) *Attorney, Agent, or Firm* — Michael A. Springs

(57) ABSTRACT

A network interface receives transaction information. A processor determines private information and public information from the received transaction information. The network interface communicates the private information to an obfuscation engine, and receives obfuscated private information. The processor then merges the obfuscated private information with the public information to create a temporary identifier, and then converts the temporary identifier into a transaction identifier. A printer then prints a portion of the public information and the transaction identifier on a transaction receipt.

11 Claims, 4 Drawing Sheets

(56) References Cited

U.S. PATENT DOCUMENTS

| | | |
|---|---|---|
| 2014/0068727 A1 | 3/2014 | Shamis |
| 2014/0122327 A1 | 5/2014 | Aleles |
| 2014/0143153 A1 | 5/2014 | Suzuki |
| 2014/0222545 A1* | 8/2014 | Hajji ................. G06Q 20/20 705/14.38 |
| 2014/0278978 A1 | 9/2014 | O'Connor |
| 2015/0235194 A1* | 8/2015 | Rashid ................ G06Q 20/202 705/21 |
| 2015/0254942 A1* | 9/2015 | Agarawal ............... G07G 5/00 235/383 |

* cited by examiner

OBFUSCATING PRIVATE INFORMATION USING A TRANSACTION IDENTIFIER

CROSS-REFERENCE TO RELATED APPLICATIONS

This application is a continuation of U.S. patent application Ser. No. 14/632,561, filed Feb. 26, 2015 and entitled "Obfuscating Private Information Using a Transaction Identifier."

TECHNICAL FIELD

This invention relates generally to creating a transaction identifier, and more particularly to creating, obfuscating, and converting public and private information to form a transaction identifier.

BACKGROUND

Individuals typically receive transaction receipts for a completed transaction. Generally, the transaction receipt fails to include private information. Accordingly, an organization may not be able to ascertain private information from the transaction receipt.

SUMMARY OF EXAMPLE EMBODIMENTS

According to embodiments of the present disclosure, disadvantages and problems associated with communicating information on a transaction receipt may be reduced or eliminated.

In accordance with a particular embodiment of the present disclosure, a network interface receives transaction information. A processor determines private information and public information from the received transaction information. The network interface communicates the private information to an obfuscation engine, and receives obfuscated private information. The processor then merges the obfuscated private information with the public information to create a temporary identifier, and then converts the temporary identifier into a transaction identifier. A printer prints a portion of the public information and the transaction identifier on a transaction receipt.

Certain embodiments of the present disclosure may provide one or more technical advantages. A technical advantage of one embodiment includes providing greater efficiencies in locating and ascertaining information associated with a transaction. As another example, a technical advantage of one embodiment includes improving the usability of transaction receipts. As yet another example, a technical advantage of one embodiment includes achieving greater efficiencies in computer resources. As yet another example, a technical advantage of one embodiment includes obfuscating private information on a public document.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Embodiments of the present invention and its advantages are best understood by referring to FIGS. 1-4, like numerals being used for like and corresponding parts of the various drawings.

Individuals may receive a transaction receipt after completing a transaction with an enterprise, such as a financial institution. Typically, the transaction receipt generally contains a subset of public information related to the transaction, but fails to include private information. With the number of transactions that an enterprise may conduct and a teller needing to manually enter information located on the transaction receipt to gather information about the transaction, the transaction receipt becomes an inefficient method of retrieving information relating to an account.

The teachings of this disclosure recognize that it would be desirable to provide a system that creates a transaction identifier associated with the transaction such that a plurality of public information and private information can be associated with the transaction using a transaction identifier on a transaction receipt. The teachings of this disclosure also recognize that it would be desirable to obfuscate the private information before creating the transaction information. This leads to greater efficiencies in accessing information associated with the transaction using the transaction receipt. In addition, by obfuscating the private information, private information may be securely presented on the transaction receipt. Furthermore, organizations may achieve greater efficiencies in network resources because the information associated with the transaction is present in the transaction receipt through the transaction identifier.

Figure 1:
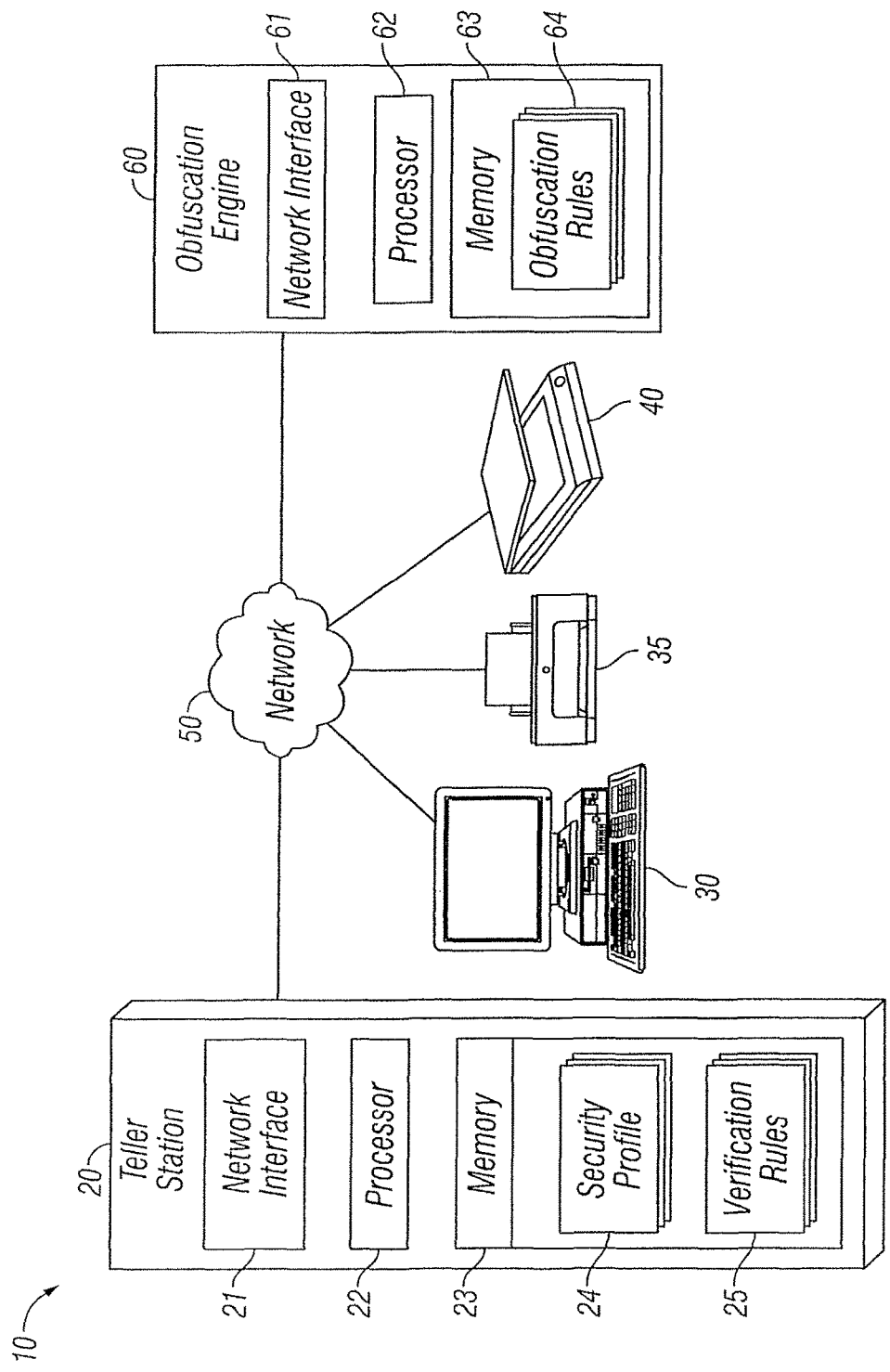
FIG. 1 illustrates a system for creating a transaction identifier and reading a received transaction identifier.

FIG. 1 illustrates a system for creating a transaction identifier and reading a received transaction identifier. More specifically, system 10 includes teller station 20, computer system 30, printer 35, scanner 40, network 50, and obfuscation engine 60. Generally, teller station 20, computer system 30, printer 35, scanner 40, and obfuscation engine 60 interact to efficiently create a transaction identifier and read a received transaction identifier. An example transaction identifier and transaction receipt is described below with reference to FIG. 2.

Teller station 20 generally represents one or more computer systems that interact with either the teller or the client to create a transaction identifier or ascertain a transaction identifier and display the associated information for the transaction. Teller station 20 may create a transaction identifier or decode an existing transaction identifier. Teller station 20, which may contain network interface 21, processor 22, and memory 23 may be communicatively coupled by network 50 to other components within system 10.

Teller station 20 may be implemented using any suitable type of processing system and may include any suitable combination of hardware, firmware, and software. Teller station 20 may include a network service, any suitable remote service, a mainframe, a host computer, a workstation, a web server, a personal computer, a file server, or any other suitable device operable to communicate with printer 35, scanner 40, and/or obfuscation engine 60. Teller station 20 may include one or more computer systems at one or more locations. For example, an individual teller station 20 may exist at a store location to create a transaction identifier and place the transaction identifier on a transaction receipt, while a separate teller station 20 may exist at a separate location to receive a transaction identifier from a transaction receipt. Each teller station 20 may include any appropriate input devices, output devices, mass storage media, processors, memory, or other suitable components for receiving, processing, storing, and communicating data. For example, each teller station 20 may include a personal computer, workstation, network computer, kiosk, wireless data port, personal data assistant (PDA), one or more Internet Protocol (IP) telephones, smart phones, table computers, one or more servers, a server pool, one or more processors within these or other devices, or any other suitable processing device capable of receiving, processing, storing, and/or communicating information with other components of system 10. Teller station 20 may be a stand-alone computer or may be a part of a larger network of computers associated with an entity.

The functions of teller station 20 may also be performed by any suitable combination of one or more servers or other components at one or more locations. In the embodiment where the engines are servers, the servers may be public or private servers, and each server may be a virtual or physical server. The server may include one or more servers at the same or at remote locations. Also, teller station 20 may include any suitable component that functions as a server.

In certain embodiments, a teller may interact with teller station 20 to input transaction information to teller station 20. As another example, teller station 20 may be a stand-alone kiosk or implemented as part of an automated teller machine ("ATM"). In this example, the client typically interacts with teller station 20.

Teller station 20 may include a display, which may include any suitable device operable to visually present information to a user. The display may present a graphical user interface ("GUI"), which may comprise a visual interface operable to allow a user to interface with teller station 20. Generally, the GUI provides the user with an efficient and user-friendly presentation of data provided by system 10, such as charts, tables and other information. The GUI may comprise a plurality of displays having interactive fields, pull-down lists, and buttons operated by the user. In one example, the GUI presents multiple charts and tables according to specification by the user and receives commands from the user. It should be understood that the term graphical user interface may be used in the singular or in the plural to describe one or more graphical user interfaces and each of the displays of a particular graphical user interface. Further, the GUI contemplates any graphical user interface, such as a generic web browser, that processes information in system 10 and efficiently presents the information to the user. Teller station 20 can accept data from the user via the web browser (e.g., MICROSOFT INTERNET EXPLORER, GOOGLE CHROME, or MOZILLA FIREFOX) and return the appropriate HTML or eXtensible Markup Language (XML) responses.

Teller station 20 may interact with computer system 30, printer 35, scanner 40, and/or obfuscation engine 60. For example, teller station 20 may interact with computer system 30 to display public and private information associated with a transaction. As another example, teller station 20 may interact with printer 35 to print the transaction identifier on a transaction receipt. As an additional example, teller station 20 may interact with scanner 40 to scan a pre-existing transaction identifier from a transaction receipt. As yet another example, teller station 20 may interact with obfuscation engine 60 to communicate information to be obfuscated, to receive obfuscated information, communicate obfuscated information, and/or receive decoded information.

In the illustrated embodiment, teller station 20 includes network interface 21, processor 22, and memory 23. Network interface 21 represents any suitable device operable to receive information from network 50, transmit information through network 50, perform suitable processing of the information, communicate to other devices, or any combination of the preceding. For example, network interface 21 transmits information to obfuscation engine 60, receives obfuscated information from obfuscation engine 60, communicates obfuscated information from obfuscation engine 60, and/or receives un-obfuscated private information from obfuscation engine 60. Network interface 21 represents any port or connection, real or virtual, including any suitable hardware and/or software, including protocol conversion and data processing capabilities, to communicate through a Local Area Network ("LAN"), Wide Area Network ("WAN"), or other communication system that allows teller station 20 to exchange information with computer system 30, printer 35, scanner 40, network 50, obfuscation engine 60, and other components of system 10.

Processor 22 controls the operation and administration of teller station 20 by processing information received from network interface 21 and memory 23. Processor 22 communicatively couples to network interface 21 and memory 23. Processor 22 includes any hardware and/or software that operates to control and process information. For example, processor 22 controls the operation of teller station 20. Processor 22 may be a programmable logic device, a microcontroller, a microprocessor, any suitable processing device, or any suitable combination of the preceding. Additionally, processor 22 may be a component external to teller station 20. Processor 22 can be located in any location suitable for processor 22 to communicate with teller station 20.

Memory 23 represents a database that stores, either permanently or temporarily, security profile 24, verification rules 25, received public and/or private information from teller station 20, transaction identifier, and a variety of other information. Memory 23 includes any one or a combination of volatile or non-volatile local or remote devices suitable for storing information. For example, memory 23 may include Random Access Memory ("RAM"), Read-only Memory ("ROM"), magnetic storage devices, optical storage devices, or any other suitable information storage device or a combination of these devices. Memory 23 may include any suitable information for use in the operation of teller station 20. Additionally, memory 23 may be a component external to teller station 20. Memory 23 can be located in any location suitable for memory 23 to communicate with teller station 20.

Security profile 24 represents any type of profile or rules associated with various security aspects of a client and/or organization. In the illustrated embodiment, security profile 24 is stored in memory 23. Security profile 24 may be a component external to teller station 20. Security profile 24 may indicate the type of information that is public or private. In certain embodiments, security profile may indicate that the same piece of information can be subdivided into both public information and private information (e.g., for an account number, the last four digits are determined public while the remaining digits are determined private). Security profile 24 may be tailored to each client, a group of clients, or all clients. In addition, security profile 24 may be a set of rules that indicates whether a piece of information is public or private. As an example, if the transaction amount is over a preset threshold, the transaction amount may be considered private information. This disclosure contemplates a myriad of customizable profiles and rule sets to further determine information that is public and information that is private.

Verification rules 25 represent any type of rules associated with a client and/or organization to facilitate verification of the client and/or organization. In the illustrated embodiment, verification rules 25 are stored in memory 23. Verification rules 25 may be a component external to teller station 20. Verification rules 25 may indicate that the submitted public and/or private information is accurate. For example, teller station 20 may indicate that the submitted account number does not match the account number associated with the client. As another example, teller station 20 may flag a form for a potential error if an account number does not contain the proper number of digits for an account number. Additionally, verification rules 25 may provide a set of rules to indicate whether the received transaction identifier is accurate. For example, verification rules 25 may flag a transaction identifier if the public information from the received transaction identifier does not match the public information listed on the transaction receipt. Verification rules 25 may also include rules to verify the check digit for the transaction identifier to ensure that there are not errors. A check digit is a form of a redundancy check used for error detection. For example, verification rules 25 may use MOD 11 check digit to ensure that the received transaction identifier is correct. Other forms that verification rules 25 may include to check for errors include binary parity bit or a checksum.

System 10 includes computer system 30. Computer system 30 may be implemented using any suitable type of processing system and may include any suitable combination of hardware, firmware, and software. Computer system 30 may include one or more computer systems at one or more locations. Each computer system may include any appropriate input devices, output devices, mass storage media, processors, memory, or other suitable components for receiving, processing, storing, and communicating data. For example, each computer system 30 may include a personal computer, workstation, network computer, kiosk, wireless data port, personal data assistant (PDA), one or more Internet Protocol (IP) telephones, smart phones, table computers, one or more servers, a server pool, one or more processors within these or other devices, or any other suitable processing device capable of receiving, processing, storing, and/or communicating information with other components of system 10. Computer system 30 may be a stand-alone computer or may be a part of a larger network of computers associated with an entity.

Computer system 30 may include a display, which may include any suitable device operable to visually present information to a user. The display may present a graphical user interface ("GUI"), which may comprise a visual interface operable to allow a user to interface with computer system 30. Generally, the GUI provides the user with an efficient and user-friendly presentation of data provided by system 10, such as charts, tables and other information. The GUI may comprise a plurality of displays having interactive fields, pull-down lists, and buttons operated by the user. In one example, the GUI presents multiple charts and tables according to specification by the user and receives commands from the user. It should be understood that the term graphical user interface may be used in the singular or in the plural to describe one or more graphical user interfaces and each of the displays of a particular graphical user interface. Further, the GUI contemplates any graphical user interface, such as a generic web browser, that processes information in system 10 and efficiently presents the information to the user. Computer system 30 can accept data from the user via the web browser (e.g., MICROSOFT INTERNET EXPLORER, GOOGLE CHROME, or MOZILLA FIREFOX) and return the appropriate HTML or eXtensible Markup Language (XML) responses.

Computer system 30 may include an input device. The input device allows a user to interact with teller station 20 through computer system 30. The input device may comprise any user interface, such as a display, keyboard, mouse, or other appropriate terminal equipment.

Computer system 30 may interact with teller station 20 to display transaction information on computer system 30. For example, computer system 30 communicates with teller station 20 to display a visual representation of the public and private information associated with the transaction. A user may view and otherwise interact with the transaction information using computer system 30.

Printer 35 is a peripheral that prints a representation of graphics or text on a physical media. Printer 35 may be external to teller station 20 or internal to teller station 20. Printer 35 may print a transaction receipt with the transaction identifier. In certain embodiments, the transaction receipt is sent electronically to the client or stored on a server. Printer 35 is communicatively coupled to teller station 20.

Scanner 40 is an input device that scans an image. Scanner 40 optically scans images and converts the image to a digital image. In certain embodiments, scanner 40 is a barcode and/or QR code reader that reads the data encoded in a barcode and/or QR code. Scanner 30 may scan the transaction receipt and/or the transaction identifier. In exemplary embodiments, scanner 30 may automatically recognize the information encoded in the transaction receipt and/or transaction identifier and communicate the information to teller station 20. For example, scanner 40 optically recognizes the characters on the transaction receipt. In certain embodiments, teller station 20 receives the transaction identifier electronically from the client or teller station 20 retrieves the transaction identifier from a database. Scanner 40 is communicatively coupled to teller station 20.

Network 50 facilitates communications between teller station 20, printer 35, scanner 40, obfuscation engine 50, and any other components in system 10. This disclosure contemplates any suitable network 50 operable to facilitate communication between the components of system 10. Network 50 may include any interconnecting system capable of transmitting audio, video, signals, data, messages, or any combination of the preceding. Network 50 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. This disclosure contemplates end networks having one or more of the described properties of network 50.

Obfuscation engine 60 obfuscates information received from teller station 20, decodes obfuscated information received from teller station 20, communicates obfuscated information to teller station 20, and/or communicates decoded information to teller station 20.

Obfuscation engine 60 may obfuscate the received information such that the information cannot be reverse-engineered outside of the enterprise. In a non-limiting embodiment, obfuscation engine 60 substitutes each character in the data with a character found in the substitution table or substitution algorithm. In this example, obfuscation engine 60 comprises a substitution table and/or substitution algorithm, which provides a substitute character for each inputted character. Accordingly, the obfuscated private information sent back to teller station 20 could not be reverse engineered back to its original form without knowing the substitution table or substitution algorithm. Another example is using an encryption algorithm to encrypt the data. Using the encryption algorithm, obfuscation engine 60 may encrypt the private information with an encryption key so that it can be read only by someone who has a decryption key. In certain embodiments, obfuscation engine 60 may obfuscate the data through several rounds of obfuscation. For example, teller station 20 may first encrypt the data and then apply a substitution technique (or vice versa).

Obfuscation engine 60 may also convert obfuscated engine to its original form by using the reverse process used to obfuscate the information. As an example, obfuscation engine 60 uses the substitution table and/or substitution algorithm to re-substitute the original character into the information using the obfuscated character.

Obfuscation engine 60 may include a network service, any suitable remote service, a mainframe, a host computer, a workstation, a web server, a personal computer, a file server, or any other suitable device operable to communicate with teller station 20. In certain embodiments, obfuscation engine 60 may be a part of or distinct from teller station 20. In some embodiments, obfuscation engine 60 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems. The functions of obfuscation engine 60 may be performed by any suitable combination of one or more servers or other components at one or more locations. In the embodiment where the engines are servers, the servers may be public or private servers, and each server may be a virtual or physical server. The server may include one or more servers at the same or at remote locations. Also, obfuscation engine 60 may include any suitable component that functions as a server.

System 10 may comprise one or more obfuscation engines 60. In certain embodiments, obfuscation engine 60 may only be accessed by specified teller stations 20. Using this specified access, an enterprise may have multiple obfuscation engines 60 with each engine being accessible by a specified group of teller systems 20. Teller systems 20 may belong to one or more obfuscation engines 60. In certain embodiments, a single obfuscation engine 60 may be accessible by only a single teller station 20.

In the illustrated embodiment, obfuscation engines 60 include network interface 61, processor 62, and memory 63. Network interface 61 represents any suitable device operable to receive information from network 50, transmit information through network 50, perform suitable processing of the information, communicate to other devices, or any combination of the preceding. For example, network interface 61 receives information from teller station 20 and returns obfuscated information to teller station 20. As another example, network interface 61 receives obfuscated information from teller station 20 and communicates the un-obfuscated information to teller station 20. Network interface 61 represents any port or connection, real or virtual, including any suitable hardware and/or software, including protocol conversion and data processing capabilities, to communicate through a LAN, WAN, or other communication system that allows obfuscation engine 60 to exchange information with network 50, teller station 20, and other components of system 10.

Processor 62 controls the operation and administration of obfuscation engine 60 by processing information received from network interface 61 and memory 63. Processor 62 communicatively couples to network interface 61 and memory 63. Processor 62 includes any hardware and/or software that operates to control and process information. For example, processor 62 controls the operation of obfuscation engine 60. Processor 62 may be a programmable logic device, a microcontroller, a microprocessor, any suitable processing device, or any suitable combination of the preceding.

Memory 63 represents a database that stores, either permanently or temporarily, obfuscation rules 64. Memory 63 includes any one or a combination of volatile or non-volatile local or remote devices suitable for storing information. For example, memory 63 may include RAM, ROM, magnetic storage devices, optical storage devices, or any other suitable information storage device or a combination of these devices. Memory 63 may include any suitable information for use in the operation of obfuscation engine 60. Additionally, memory 63 may be a component external to obfuscation engine 60. Memory 63 can be located in obfuscation engine 60 or any other location suitable for memory 63 to communicate with obfuscation engine 60.

Obfuscation rules 64 are a set of rules to obfuscate or un-obfuscate information. In the illustrated embodiment, obfuscation rules 64 are stored in memory 63. Obfuscation rules 64 may be a component external to obfuscation engine 60. In certain embodiments, obfuscation rules 60 contain instructions such that obfuscation engine 60 provides instructions to substitute the characters in the information to either obfuscate or un-obfuscate the information. As another example, obfuscation rules 64 contain the encryption algorithm and decryption algorithm to encrypt and/or decrypt data.

In an exemplary embodiment of operation, in order to keep a written record of transactions between a client and an organization, a client provides teller station 20 with transaction information. A client may complete information on a form to create the transaction information. The transaction information can be in the form of a blank form, a pre-printed form, a form that contains information keyed to the client, or any other type of document that records client information and a proposed transaction. The form may be a physical form written or printed on a piece of paper, or may exist virtually on a computer or can exist on the internet. The form may contain fields that indicate where a client inputs information. Some of the fields may ask for information that an organization may deem public. Examples of public information include a client's full name (first, middle, last), home address, place of residence, business address, client's gender, routing number for associated accounts, and an employer name. Public information may include information that is spliced from a full-set of client information (i.e., a portion of the information is public and a portion of the information is private). Examples of spliced public information include a portion of a driver's license number, specific digits of a person's account number, a portion of a person's passport number, a portion of a person's social security number, or any information that may contain public information such that the release of the public information will not reveal the entirety of the information. Private information is information that a client and/or enterprise may deem private. Examples of private information include nationality, the state which the account resides, residence status, date of birth, place of birth, marital status, home ownership, monthly income, source of income, educational level, and/or occupation.

Once a client finishes filling out a form, the client may submit the form to teller station 20. The client may physically hand the form to a teller, the client may scan the document, the client may perform the proper actions to submit the form over the computer, or any other method that a client may transfer the form information to the teller or teller station 20. Once received, scanner 40 may automatically recognize the information on the form through character recognition, the teller may input the information written on the form to teller station 20, the information on the form may be submitted over network 50, or it may be a combination of any of the preceding.

Teller station 20 then determines the information on the form that is public information and the information on the form that is private. In certain embodiments, teller station 20 determines the public and/or private information through security profile 24. As an example, a client may include information within security profile 24 that indicates what is private information to a client and what is public information to a client. As another example, teller station 20 may automatically determine if information is private or public based on security profile 24. For example, security profile 24 may indicate that if a person's place of residence is from a country with stricter privacy rights, teller station 20 may adjust which information is private to meet the rules and regulations of that country.

Teller station 20 may also contain verification rules 25 such that teller station 20 verifies whether the information on the form is accurate. For example, verification rules 25 may indicate that a form has a potential error if the account number on the form does not match the account number in the records. As another example, verification rules 25 may flag a form for a potential error if a social security number does not contain the exact number of digits required for a social security number.

Teller station 20 communicates the private information to obfuscation engine 60. In certain embodiments, teller station 20 communicates only a select portion of the private information to an obfuscation engine. Obfuscation engine 60 obfuscates the private information before returning the obfuscated private information to teller station 20. Obfuscation engine 60 may obfuscate the private information such that the private information cannot be reverse-engineered outside of the enterprise. In a non-limiting embodiment, obfuscation engine 60 substitutes each character in the data with a character found in the substitution table or based on a substitution algorithm. In this example, obfuscation engine 60 comprises a substitution table and/or substitution algorithm, which provides a substitute character for each inputted character. Accordingly, the obfuscated private information sent back to teller station 20 could not be reverse engineered back to its original form without knowing the substitution table or substitution algorithm. Another example is using an encryption algorithm to encrypt the data. Using the encryption algorithm, obfuscation engine 60 may encrypt the private information with an encryption key so that it can be read only by someone who has a decryption key. In certain embodiments, obfuscation engine 60 may obfuscate the data through several rounds of obfuscation. For example, teller station 20 may first encrypt the data and then apply a substitution technique (or vice versa).

Once obfuscated, obfuscation engine 60 communicates the obfuscated private information back to teller station 20. The communication may be transmitted over a secure line, such as an encrypted line. Teller station 20 then merges the obfuscated private information with the public information to create a temporary identifier. Merging the data may include placing the public information in front of the obfuscated private information. Another example of merging the data to create a temporary identifier includes placing different fields of public information into different locations in the identifier. Teller station 20 may also place delimiter characters between each piece of information, or between the public and private information, in order to identify each piece of information. The delimiter character may be a specialized character for each form of information or a generic character to divide the pieces of information. For example, if the transaction identifier is in hexadecimal form, the delimiter characters may be non-hexadecimal characters. In other embodiments, teller station 20 reserves a certain number of spaces for each piece of transaction information. A temporary identifier may be a string of alphanumeric characters or any type of string that includes the information for the public information and the obfuscated private information. In certain embodiments, only a select portion of the public information and/or private information is selected to form part of the temporary identifier. The selection may be based on a transaction identifier rule set that indicates which information will be used to create the transaction identifier. In an exemplary embodiment, teller station 20 may include a check sum or check digit into the transaction identifier in order to verify the transaction identifier at the later time. The check sum or check digit (e.g., MOD 11 check digit) may be used when the transaction identifier is later received to reduce the chance of an error when decoding the transaction identifier.

After teller station 20 creates the temporary identifier, teller station 20 then converts the temporary identifier into a transaction identifier. The conversion transforms the temporary identifier into a different format. As an example, the temporary identifier is converted from an alphanumeric text form to a hexadecimal form. Alternatively, the temporary identifier is converted to a barcode, Quick Response ("QR") code, or any other type of image, graphic, and/or representation that teller station 20 can read and decode the private and public information associated with the transaction identifier. In certain embodiments, the temporary identifier is communicated to obfuscation engine 60. Obfuscation engine 60 then obfuscates the temporary identifier and returns the obfuscated temporary identifier to teller station 20.

The transaction identifier is an identifier that identifies information, including public and private information, with a transaction. The transaction identifier may be in the form of a bar code or QR code. In certain embodiments, the transaction identifier is printed on a transaction receipt. The transaction receipt may be a printed form of paper that the teller provides to the client. The transaction receipt may display the public information on the transaction receipt. For example, the transaction receipt may display the client's first and last name. Generally, the transaction receipt does not display the private information on the transaction receipt. In certain embodiments, the transaction identifier that is on the transaction receipt is a barcode or QR code. The transaction receipt may be a receipt that is displayed online to the client. For example, an organization may provide a client a virtual transaction receipt after the client completes a transaction online. An organization may also store the transaction identifier internally in a database. In an exemplary embodiment, a compression algorithm is run on transaction identifier to reduce the length of the transaction identifier.

At a later time, a client may return with the transaction receipt. A client may return for a multitude of reasons, such as verifying a transaction, deleting or changing items on the transaction, or any other reason that the client may require an organization to access information pertaining to a particular transaction. In addition, an organization may locate a transaction identifier associated with a transaction. An organization may locate a transaction identifier to perform an audit of its past transactions or it may be a general inquiry into a particular transaction.

Upon receipt of the transaction receipt, teller station 20 may locate information related to the previous transaction using the transaction identifier. The teller may submit the transaction identifier and/or transaction receipt to teller station 20. Entering in the transaction identifier may be completed manually, by scanner 40 that recognizes the characters in the transaction identifier, by scanner 40 recognizing a barcode or QR code, or any other type of means that allows the transfer of information of the transaction identifier to the computer. Entering the transaction identifier may also be completed in other automatic ways. For example, if the client is online, the transaction identifier may be passed over when the client enters in transaction identifier or it appears on the transaction receipt. In certain embodiments, teller station 20 verifies that transaction identifier is accurate by using verification rules 25. For example, verification rules 25 will use the check digit in the transaction identifier to ensure the accuracy of the transaction identifier.

The transaction identifier must be converted to the temporary identifier. The conversion changes the transaction identifier to its temporary identifier. This may include converting the hexadecimal version of the transaction identifier to an alphanumeric version. In certain embodiments, the transaction identifier must be communicated from teller station 20 to obfuscation engine 60. Obfuscation engine 60 may return an un-obfuscated temporary identifier from the sent obfuscated transaction identifier.

Next, teller station 20 must parse the temporary identifier to its public information and its obfuscated private information. In certain embodiments, teller station 20 uses the delimiter characters or preset spaces to parse the public information and private information into its components. In exemplary embodiments, teller station 20 verifies whether the transaction identifier is accurate by comparing public information from the temporary identifier to public information located on the transaction receipt. If the parsed public information does not match the identified public information, teller station 20 may flag the transaction receipt. Flagging the transaction receipt may include notifying the teller at teller station 20 to manually enter in the transaction identifier. In other embodiments, flagging the transaction receipt may notify a client to see a representative at the organization for further instructions. The public information located on the transaction receipt may be communicated to teller station 20 automatically from scanner 40.

Teller station 20 communicates the obfuscated private information to obfuscation engine. 60. Obfuscation engine 60 converts the obfuscated private information to un-obfuscated private information by using the reverse process it used to obfuscate the information or another available reverse process to un-obfuscate the private information. As an example, obfuscation engine 60 uses the substitution table and/or substitution algorithm to re-substitute the original character into the information using the obfuscated character. Obfuscation engine 60 then returns the un-obfuscated private information to teller station 20.

Once completed, teller station 20 may display the public information and un-obfuscated private information. In certain embodiments, the teller may view a portion or all of the information associated with the transaction and/or client using teller station 20. The teller may view, modify, and/or delete information from the transaction using teller station 20.

A component of system 10 may include an interface, logic, memory, and other suitable elements. An interface receives input, sends output processes the input and/or output, and performs other suitable operations. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Modifications, additions, or omissions may be made to system 10 without departing from the scope of the invention. For example, system 10 may include any number of teller stations 20, printers 30, scanners 40, and obfuscation engines 60. Furthermore, the components of system 10 may be integrated or separated. For example, teller station 20 and obfuscation engine 60 may be incorporated into a single component.

Figure 2:
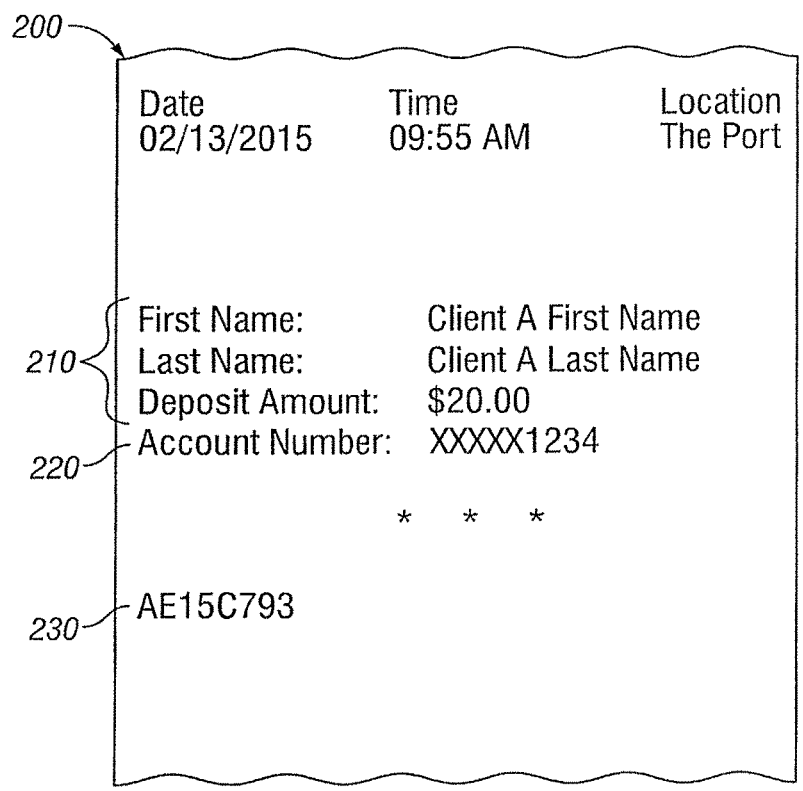
FIG. 2 illustrates an example transaction receipt.

FIG. 2 illustrates an example transaction receipt 200. Transaction receipt 200 may be generated by teller station 20 through the use of printer 35. In the illustrated embodiment, transaction receipt 200 contains public information 210, private information 220, and transaction identifier 230.

In an embodiment, transaction receipt 200 may be a printed form of paper that the teller provides to the client. Transaction receipt 200 may include the public information on the transaction receipt. For example, transaction receipt 200 may display the client's first and last name. Generally, transaction receipt 200 does not display the private information on transaction receipt 200. In another embodiment, transaction receipt 200 may be a receipt that is displayed online to the client and/or stored in an enterprise database. For example, an organization may provide a client a virtual transaction receipt 200 after the client completes a transaction online.

Public information 210 comprises information that an organization and/or client may deem public. Examples of public information 210 include a client's full name (first, middle, last), home address, place of residence, business address, client's gender, routing number for associated accounts, and an employer name. Public information 210 may include information that is spliced from a full-set of client information (i.e., a portion of the information is public and a portion of the information is private). Examples of spliced public information 210 include a portion of a driver's license number, specific digits of a person's account number, a portion of a person's passport number, a portion of a person's social security number, or any information that may contain public information such that the release of the public information will not disseminate the entirety of the information. In the illustrated embodiment, the first name, last name, deposit amount, and last four digits of the account number constitute public information 210.

Private information 220 is information that a client and/or organization may deem private. Examples of private information include nationality, residence status, date of birth, place of birth, marital status, home ownership, monthly income, source of income, educational level, and/or occupation. Similar to spliced public information 210, private information 220 may include information that is spliced from a full-set of client information. Examples of spliced private information 220 include a portion of a driver's license number, specific digits of a person's account number, a portion of a person's passport number, a portion of a person's social security number, or any information that may contain private information such that the release of a portion of the information will not disseminate the entirety of the information. In the illustrated embodiment, the first five digits of the account number (which is represented by the character 'X') is spliced private information 220.

Transaction identifier 230 is an identifier that identifies information, including public and private information, with a transaction. Transaction identifier 230 may be in the form of a bar code or QR code. In the illustrated embodiments, transaction identifier 230 is printed on transaction receipt 200. In certain embodiments, transaction identifier 230 that is on transaction receipt 200 is a barcode or QR code. An organization may also store transaction identifier 230 internally in a database. In an exemplary embodiment, a compression algorithm is run on transaction identifier 230 to reduce the length of transaction identifier 230.

Modifications, additions, or omissions may be made to transaction receipt 200 without departing from the scope of the invention.

Figure 3:
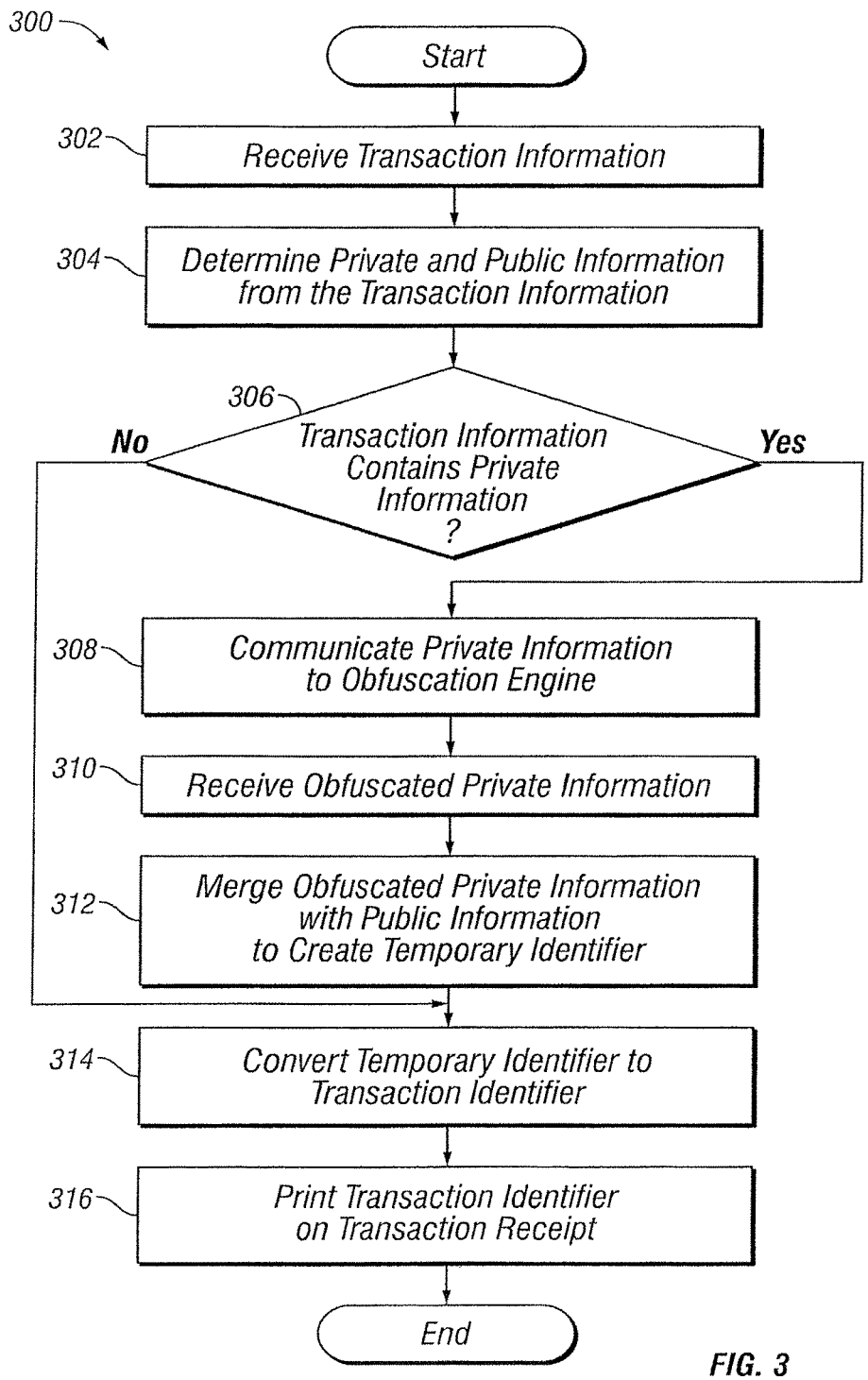
FIG. 3 illustrates an example method for creating a transaction identifier from received transaction information.

FIG. 3 illustrates an example method for creating a transaction identifier from received transaction information. The method begins at step 302 when teller station 20 receives transaction information. In certain embodiments, a client provides teller station 20 with transaction information. The client may physically hand the form to a teller, the client may scan the document, the client may perform the proper actions to submit the form over the computer, or any other method that a client may transfer the form information to the teller. A client may complete information on a form to create the transaction information. The transaction information can be in the form of a blank form, a pre-printed form, a form that contains information keyed to the client, or any other type of document that records client information and proposed transaction. The form may be a physical form written or printed on a piece of paper, or may exist virtually on a computer or can exist on the internet. The form may contain fields that indicate where a client inputs information. Some of the fields may ask for information that an organization may deem public. Examples of public information include a client's full name (first, middle, last), home address, place of residence, business address, client's gender, routing number for associated accounts, and an employer name. Public information may include information that is spliced from a full-set of client information (i.e., a portion of the information is public and a portion of the information is private). Examples of spliced public information includes a portion of a driver's license number, specific digits of a person's account number, a portion of a person's passport number, a portion of a person's social security number, or any information that may contain public information such that the release of the public information will not reveal the entirety of the information. Private information is information that a client and/or enterprise may deem private. Examples of private information include nationality, residence status, date of birth, place of birth, marital status, home ownership, monthly income, source of income, educational level, and/or occupation.

At step 304, teller station 20 determines public information and private information from the received transaction information. In certain embodiments, teller station 20 determines the public and/or private information through security profile 24. As an example, a client may provide information to security profile 24 that indicates what is private information to a client and what is public information to a client. As another example, teller station 20 may automatically determine if information is private or public based on security profile 24. For example, security profile 24 may indicate that if a person's place of residence is from a country with stricter privacy rights, teller station 20 may adjust which information is private to meet the rules and regulations of that country.

If at step 306, the transaction information does not contain private information, the method proceeds to step 314. However, if the transaction information does contain private information, the method proceeds to step 308.

At step 308, teller station 20 communicates the private information to obfuscation engine 60. In certain embodiments, teller station 20 communicates only a select portion of the private information to an obfuscation engine.

Proceeding to step 310, teller station 20 receives the obfuscated private information from obfuscation engine 60. At step 312, teller station 20 merges the obfuscated private information with the public information to create a temporary identifier. Merging the data may include placing the public information in front of the obfuscated private information. Another example of merging the data to create a temporary identifier includes placing different fields of public information into different locations in the identifier. Teller station 20 may also place delimiter characters between each piece of information, or between the public and private information, in order to identify each piece of information. The delimiter character may be a specialized character for each form of information or a generic character to divide the pieces of information. In other embodiments, teller station 20 reserves a certain number of spaces for each piece of information. A temporary identifier may be a string of alphanumeric characters or any type of string that includes the information for the public information and the obfuscated private information. In certain embodiments, only a select portion of the public information and/or private information is selected to form part of the temporary identifier. The selection may be based on a transaction identifier rule set that indicates which information will be used to create the transaction identifier.

During step 314, teller station 20 converts the temporary identifier to a transaction identifier. The conversion transforms the temporary identifier into a different format. As an example, the temporary identifier is converted from an alphanumeric text form to a hexadecimal form. Alternatively, the temporary identifier is converted to a barcode, Quick Response ("QR") code, or any other type of image/graphic that can be read back into its temporary identifier. In certain embodiments, the temporary identifier is communicated to obfuscation engine 60. Obfuscation engine 60 then obfuscates the temporary identifier and returns the obfuscated temporary identifier to teller station 20.

Finally, at step 316, teller station 20 prints transaction identifier on a transaction receipt. The transaction identifier may be in the form of a bar code or QR code. The transaction receipt may be a printed form of paper that the teller provides to the client. The transaction receipt may display the public information on the transaction receipt. For example, the transaction receipt may display the client's first and last name. Generally, the transaction receipt does not display the private information on the transaction receipt. In certain embodiments, the transaction identifier that is on the transaction receipt is a barcode or QR code. The transaction receipt may be a receipt that is displayed online to the client. For example, an organization may provide a client a virtual client receipt after the client completes a transaction online. An organization may also store the transaction identifier internally in a database. In an exemplary embodiment, a compression algorithm is run on transaction identifier to reduce the length of the transaction identifier.

Modifications, additions, or omissions may be made to the method depicted in FIG. 3. The method may include more, fewer, or other steps. For example, teller station 20 may communicate the transaction identifier to obfuscation engine 60 and may receive an obfuscated transaction identifier. While discussed as teller station 20 performing the steps, any suitable component of system 10 may perform one or more steps of the method.

Figure 4:
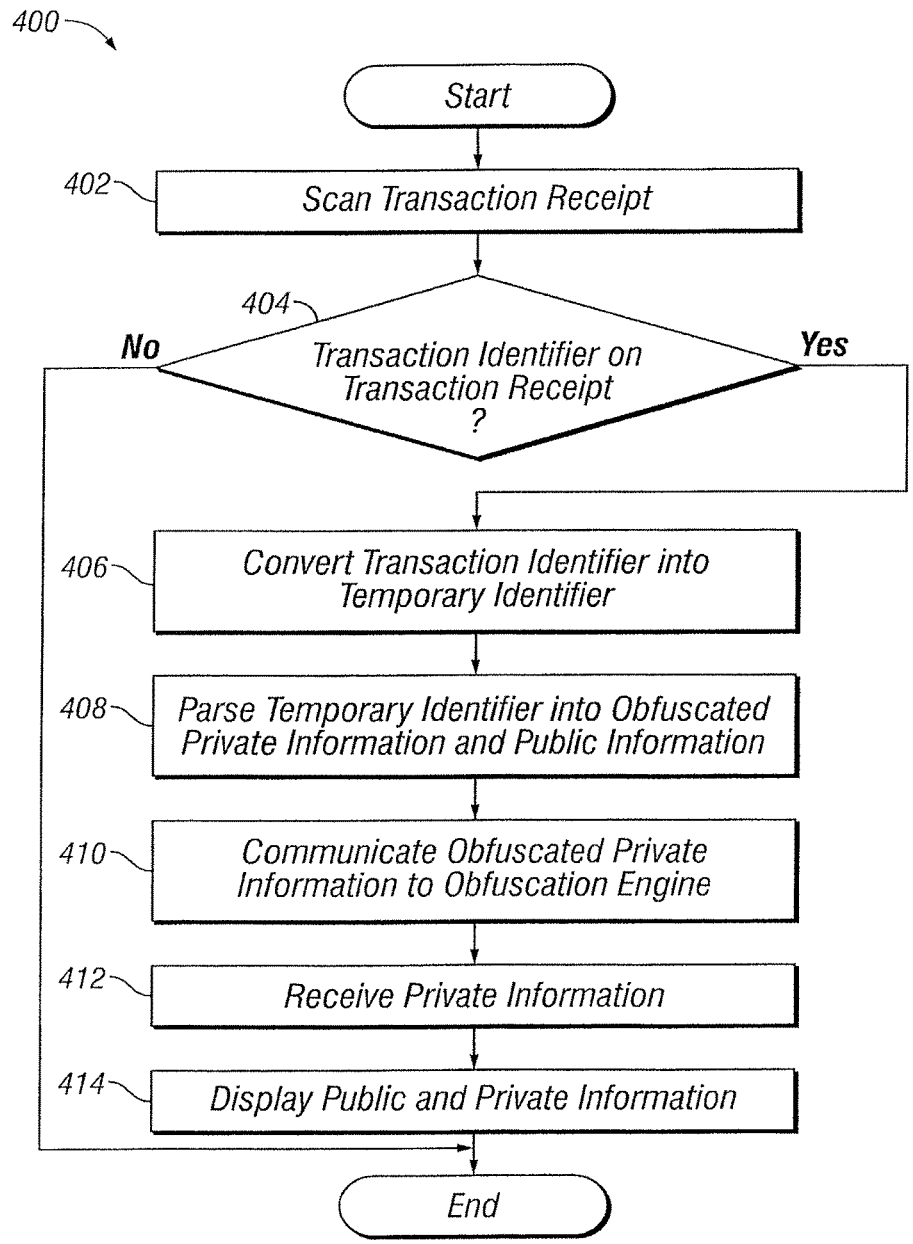
FIG. 4 illustrates an example method for extracting public and private information from a received transaction identifier.

FIG. 4 illustrates an example method for extracting public and private information from a received transaction identifier. At step 402, teller station 20 receives a transaction receipt. Teller station 20 may receive a receipt through scanner 40.

At step 404, teller station 20 determines if a transaction identifier is on the received transaction receipt. If the transaction receipt does not contain a transaction identifier, the method ends. On the other hand, if the transaction receipt contains a transaction identifier, the method proceeds to step 406.

At step 406, teller station 20 converts the transaction identifier to a temporary identifier. This may include converting the hexadecimal version of the transaction identifier to an alphanumeric version. In certain embodiments, the transaction identifier must be communicated from teller station 20 to obfuscation engine 60. Obfuscation engine 60 may return an un-obfuscated temporary identifier from the sent obfuscated transaction identifier.

Next, at step 408, teller station 20 must parse the temporary identifier to its public information and its obfuscated private information. In certain embodiments, teller station 20 uses the delimiter characters or preset spaces to parse the public information and private information into its components. In exemplary embodiments, teller station 20 verifies the transaction identifier is accurate by comparing public information from the temporary identifier to public information located on the transaction receipt. In exemplary embodiments, the public information located on the transaction receipt may be communicated to teller station 20 automatically from scanner 40.

At step 410, teller station 20 communicates the obfuscated private information to obfuscation engine 60. Obfuscation engine 60 converts the obfuscated private information to un-obfuscated private information by using the reverse process it used to obfuscate the information. As an example, obfuscation engine 60 uses the substitution table or substitution algorithm to re-substitute the original character into the information using the obfuscated character. Teller station 20 receives the un-obfuscated private information at step 412.

Teller station 20 then displays the private information and public information at step 414. In certain embodiments, the teller may now view a portion or all of the information associated with the transaction and/or client. The teller may view, modify, and/or delete information from the transaction.

Modifications, additions, or omissions may be made to the method depicted in FIG. 4. The method may include more, fewer, or other steps. For example, teller station 20 may confirm that the public information from the transaction identifier matches the public information found on the transaction receipt. While discussed as teller station 20 performing the steps, any suitable component of system 10 may perform one or more steps of the method.

Although the present invention has been described with several embodiments, a myriad of changes; variations, alterations, transformations, and modifications may be suggested to one skilled in the art, and it is intended that the present invention encompass such changes, variations, alterations, transformations, and modifications as fall within the scope of the appended claims.

What is claimed is:

1. A system, comprising:
a network interface operable to receive transaction information;
a processor communicatively coupled to the network interface and operable to determine private information and public information from the transaction information;
the network interface further operable to:
  communicate the private information to a obfuscation engine; and
  receive obfuscated private information from the obfuscation engine;
the processor further operable to:
  merge the obfuscated private information with the public information to create a temporary identifier; and
  convert the temporary identifier into a transaction identifier, wherein the transaction identifier comprises a hexadecimal representation of the temporary identifier; and
a printer communicatively coupled to the network interface and processor and operable to print a portion of the public information and the transaction identifier on a transaction receipt;
wherein:
  the transaction information comprises an account number; and
  the account number comprises personal information and public information and
wherein the network interface is further operable to:
  communicating the temporary identifier to the obfuscation engine; and
  receive an obfuscated temporary identifier from the obfuscation engine.

2. The system of claim 1, further comprising:
a scanner communicatively coupled to the network interface and the processor and operable to scan the transaction receipt;
the processor further operable to:
  automatically identify the transaction identifier on the transaction receipt;

convert the transaction identifier into the temporary identifier; and parse the temporary identifier into the obfuscated private information and the public information; and the network interface further operable to:
communicate the obfuscated private information to the obfuscation engine; and
receive the private information from the obfuscation engine.

3. The system of claim 2, wherein the processor is further operable to:
automatically identify public information on the transaction receipt;
compare the parsed public information from the temporary identifier with the identified public information on the transaction receipt; and
when the parsed public information does not match the identified public information, flag the transaction receipt.

4. The system of claim 1, wherein the transaction identifier is a quick response ("QR") code.

5. A method, comprising:
receiving, by a network interface, transaction information;
determining, by a processor, private information and public information from the transaction information;
communicating, by the network interface, the private information to an obfuscation engine;
receiving, by the network interface, obfuscated private information from the obfuscation engine;
merging, by the processor, the obfuscated private information with the public information to create a temporary identifier;
converting, by the processor, the temporary identifier into a transaction identifier, wherein the transaction identifier comprises a hexadecimal representation of the temporary identifier;
printing a portion of the public information and the transaction identifier on a transaction receipt;
communicating, by the network interface, the temporary identifier to the obfuscation engine; and
receiving, by the network interface, an obfuscated temporary identifier from the obfuscation engine;
wherein:
the transaction information comprises an account number; and
the account number comprises personal information and public information.

6. The method of claim 5, further comprising:
scanning the transaction receipt;
automatically identifying, by the processor, the transaction identifier on the transaction receipt;
converting, by the processor, the transaction identifier into the temporary identifier;
parsing, by the processor, the temporary identifier into the obfuscated private information and the public information;
communicating, by the network interface, the obfuscated private information to the obfuscation engine; and receiving, by the network interface, the private information from the obfuscation engine.

7. The method of claim 6, further comprising:
automatically identifying, by the processor, the public information on the transaction receipt;
comparing, by the processor, the parsed public information with the identified public information; and
when the parsed public information does not match the identified public information, flagging the transaction receipt.

8. The method of claim 6, wherein the transaction identifier is a quick response ("QR") code.

9. Non-transitory computer readable medium comprising logic, the logic, when executed by a processor, operable to:
receive transaction information;
determine private information and public information from the transaction information;
communicate the private information to an obfuscation engine;
receive obfuscated private information from the obfuscation engine;
merge the obfuscated private information with the public information to create a temporary identifier;
convert the temporary identifier into a transaction identifier, wherein the transaction identifier comprises a hexadecimal representation of the temporary identifier;
print a portion of the public information and the transaction identifier on a transaction receipt;
send the temporary identifier to the obfuscation engine; and
receive an obfuscated temporary identifier from the obfuscation engine;
wherein:
the transaction information comprises an account number; and
the account number comprises personal information and public information.

10. The computer readable medium of claim 9, wherein the logic is further operable to:
scan the transaction receipt;
automatically identify the transaction identifier on the transaction receipt;
convert the transaction identifier into the temporary identifier;
parse the temporary identifier into the obfuscated private information and the public information;
communicate the obfuscated private information to the obfuscation engine; and
receive the private information from the obfuscation engine.

11. The computer readable medium of claim 10, wherein the logic is further operable to:
automatically identify the public information on the transaction receipt;
compare the parsed public information with the identified public information; and
when the parsed public information does not match the identified public information, flag the transaction receipt.

* * * * *